US006394414B1

(12) United States Patent
Breitling et al.

(10) Patent No.: US 6,394,414 B1
(45) Date of Patent: May 28, 2002

(54) ELECTRONIC CONTROL CIRCUIT

(75) Inventors: Wolfram Breitling, Sachsenheim; Horst Singer, Tamm; Reinhold Weible, Stuttgart; Rolf Falliano, Schlechtbach; Florian Richter, Hemmingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/423,568

(22) PCT Filed: May 7, 1998

(86) PCT No.: PCT/DE98/01253

§ 371 (c)(1),
(2), (4) Date: Feb. 28, 2000

(87) PCT Pub. No.: WO98/52201

PCT Pub. Date: Nov. 19, 1998

(30) Foreign Application Priority Data

May 9, 1997 (DE) ........................................ 197 19 602

(51) Int. Cl.$^7$ ................................................ F16K 31/02
(52) U.S. Cl. .................................................. 251/129.04
(58) Field of Search ................................ 361/153, 154, 361/187; 251/129.04, 129.08

(56) References Cited

U.S. PATENT DOCUMENTS

| | | | | |
|---|---|---|---|---|
| 4,870,364 A | | 9/1989 | Trox et al. | |
| 5,377,068 A | * | 12/1994 | Kaylor et al. | 361/154 |
| 5,379,178 A | * | 1/1995 | Graf et al. | 361/153 X |
| 5,650,909 A | * | 7/1997 | Remele et al. | 361/154 |
| 5,662,081 A | * | 9/1997 | Ng et al. | 361/187 X |
| 5,691,680 A | * | 11/1997 | Schrey et al. | 361/187 X |
| 5,877,931 A | * | 3/1999 | Groppo et al. | 361/154 X |
| 5,917,692 A | * | 6/1999 | Schmitz et al. | 361/187 |
| 5,941,216 A | * | 8/1999 | Arakawa | 361/154 X |
| 5,947,090 A | * | 9/1999 | Maeda | 361/154 X |
| 5,959,825 A | * | 9/1999 | Harcombe | 361/154 |
| 6,123,092 A | * | 9/2000 | Torii | 361/187 X |

FOREIGN PATENT DOCUMENTS

| | | |
|---|---|---|
| DE | 37 01 985 | 8/1988 |
| DE | 38 17 770 | 11/1989 |
| DE | 40 11 217 | 10/1991 |
| DE | 40 31 427 | 4/1992 |
| DE | 41 10 254 | 10/1992 |
| DE | 296 08 622 | 8/1996 |
| DE | 195 30 121 | 2/1997 |
| EP | 0 376 493 | 7/1990 |
| WO | 94/19810 | 9/1994 |

* cited by examiner

*Primary Examiner*—Henry C. Yuen
*Assistant Examiner*—John Bastranelli
(74) *Attorney, Agent, or Firm*—Kenyon & Kenyon

(57) ABSTRACT

An electronic control circuit for controlling an electromagnetic valve having an armature, in particular for a heating and/or air-conditioning system in a motor vehicle, has an electronic switching element in series with the coil of the valve and is characterized in that the switching element controls the valve voltage (or the valve current) applied to the coil so that the valve voltage reaches a first value when the valve is switched on; then the valve voltage is reduced to a second value which is lower than the first value; and thereafter the valve voltage assumes a third value which is greater than the second value and represents a holding voltage for holding the armature in its switched-on position.

18 Claims, 4 Drawing Sheets

ELECTRONIC CONTROL CIRCUIT

FIELD OF THE INVENTION

The present invention relates to an electronic control circuit for controlling an electromagnetic valve having an armature, in particular for a heating and/or air-conditioning system in a motor vehicle, having an electronic switching element in series with the coil of the valve.

BACKGROUND INFORMATION

International Patent Publication No. WO 94/19810 describes a control circuit for a solenoid valve which varies the driving current of the solenoid valve over time when the solenoid valve is to be brought from a flow-through position to a closed position. This is done because the driving current of the valve is reduced (but not to zero) so that the solenoid valve drops. Immediately thereafter, the driving current is increased again, but the current value remains below a value at which the solenoid valve is moved into its closed position. Consequently, the control circuit controls the driving current during the shut-down phase.

Conventional solenoid valves can be operated with a square-wave pulse-like driving current. In other words, the excitation of the solenoid is switched either off or on, and it is at the maximum when switched on.

In addition, it is known that the driving current for the coil excitation can first be controlled at an elevated value at the start of the pulse, with the coil excitation being returned to a nominal value at which the armature remains in a holding position (after a spring-loaded armature has overcome the first spring forces and adhesive friction).

One disadvantage of the conventional solenoid valves is that they produce relatively loud switching noises in closing when the armature and/or the valve strikes a stop in closing. If the valve is used to control an air-conditioning system in a motor vehicle, for example, the switching noises will be disturbing especially in slow driving and when the vehicle is standing still, because then the engine and driving noises are low.

SUMMARY OF THE INVENTION

An electronic control circuit according to the present invention for controlling an electromagnetic valve having an armature, in particular for a heating and/or air-conditioning system in a motor vehicle, having an electronic switching element in series with the coil of the valve offers the advantage compared to the related art that the switching element controls the valve voltage (or the valve current) applied to the coil so that the valve voltage reaches a first value when the valve is switched on; then the valve voltage is reduced to a second value which is lower than the first value, and thereafter the valve voltage assumes a third value which is greater than the second value and represents a holding voltage for holding the armature in its switched-on position. Due to the fact that the electromagnetic valve is first operated at a first value of the valve voltage, the armature is first accelerated to the extent that the initial spring forces and the adhesive friction are overcome. The armature thus set in motion then experiences a reduced acceleration due to the reduced electromagnetic energy, because the second value of the valve voltage is lower than the first value, but the second value is preferably selected so that the armature essentially maintains its speed. In the course of the remaining switch-on operation, the valve voltage assumes a third value which is greater than the second value, so that the armature of the valve enters the end position in a very short period of time despite the previous reduction in voltage from the first value to the second value. Furthermore, this yields the advantage that the armature striking the end stop is not associated with the loud impact noise mentioned in the related art, because the voltage and current program according to the present invention permits rapid switching while nevertheless preventing an excessive speed on impact with the end stop.

According to the present invention, the first value of the valve voltage or the valve current is in the form of a switch-on pulse, with the amplitude of the switch-on pulse being greater than half the nominal value. The period of the switch-on pulse amounts to approximately 0.1 to 0.6 times the valve switching time with abrupt excitation of the valve with a voltage higher than the holding voltage. As an alternative, the switch-on pulse may be composed of multiple successive pulses.

In addition, the second value of the valve voltage or valve current forms an initial value for a switch-on ramp. The second value amounts to a maximum of 0.8 times the nominal value of the valve voltage and/or valve current. After the valve voltage and/or valve current has been reduced from the first value to the second value, the switch-on pulse is followed by a voltage and/or current characteristic having a linear rise. As an alternative, the rise of the switch-on ramp may be nonlinear, preferably progressive or degressive. From this it can be deduced that the electromagnetic valve is operated with a magnetic energy that is reduced but is specifically controlled to increase during the switch-on ramp, so the acceleration of the armature is reduced.

In addition, it is provided in a preferred embodiment that the switch-on pulse is followed by a "dead time" during which the valve voltage and/or valve current is kept constant at the second value so that ramping of the switch-on ramp is delayed.

The end value of the switch-on ramp preferably forms the third value, with the third value corresponding in particular to the nominal value of the valve voltage and/or the valve current. The third value has a level at least corresponding to the holding voltage of the armature in its switched-on position. The valve voltage and/or valve current is kept constant for a period of time during which the valve is in the closed position. This period of time can be varied as needed.

To shut down the valve, the valve voltage and/or valve current is reduced abruptly, namely to a value between the third value and the voltage-free state. In another embodiment of the present invention, this value at the same time forms an initial value of a shut-down ramp. During the shut-down ramp, the valve voltage and/or valve current drops linearly to zero. As an alternative, the characteristic of the shut-down ramp may have a nonlinear decline, i.e., it may be progressive or degressive in particular. The duration of the shut-down ramp is determined by a coil free-wheeling diode, for example, connected in parallel to the coil.

In another embodiment, the individual control segments (switch-on pulse, dead time, switch-on ramp, switched-on position and shut-down ramp) are not determined by fixedly preselected conditions, but instead by the fact that instantaneous parameters of state determine the amplitude and/or the duration of at least one control segment. In a motor vehicle, for example, such parameters of state include the battery voltage, the rpm of a water pump in a combustion engine, the fluid pressure of a water circuit for an air-conditioning system and the coil temperature. In addition, it is necessary to detect the parameters of state by using suitable sensors. For example, a thermocouple may be provided to detect the coil temperature.

In addition, the level of the switch-on pulse, i.e., the level of the first value, is preferably adjusted to a desired level by the electronic switching element independently of the power supply voltage (for example, this may be the vehicle electric system, i.e., the battery voltage) of the electronic control circuit. This is important in particular when the battery voltage is not constant because of external influences, e.g., the outside temperature, because then reproducible switch-on operations are always achieved nevertheless.

Furthermore, the duration of the switch-on pulses is automatically adjustable in particular. The duration of the switch-on pulse depends on the position of the armature. The position of the armature is derived from the characteristic of the valve voltage and/or valve current by using a suitable electronic circuit which can be assigned to the electronic control circuit.

In another embodiment, an analyzing device is allocated to the electronic control circuit. This allocation includes not only providing information between them but also the spatial arrangement relative to one another. In particular, the analyzing device is part of the electronic control circuit.

At the start of the switch-on operation of the valve, the analyzing device determines from the rate of increase in the valve voltage and/or valve current a time at which the valve current will assume a plateau value which is below the holding current of the armature and at which the rate of increase in the valve current is zero or approximately zero. The rise in the valve current in this time range corresponds to the switch-on pulse mentioned in the preamble, but the valve current rise is preferably nonlinear (as a function of the inductance of the coil). In addition, the characteristic of the valve current and/or valve voltage is first determined during a switch-on operation when the valve is influenced by no interference quantities or only by those of a known value. This characteristic corresponds to a setpoint curve from which the slope is determined at any desired time, so that with a deviating characteristic (from which a deviating slope also follows) of the valve current and/or valve voltage, inferences can be drawn regarding the conditions under which the valve operates. If interference quantities act on the valve or emanate from the valve itself, the characteristic and the rate of increase of the valve current and/or valve voltage also change. Therefore, on the basis of a comparison between the setpoint curve and the characteristic of the valve current and/or valve voltage, it is possible to draw a conclusion regarding the extent of the acting interference quantity (quantities), so that the characteristic of the valve current and/or valve voltage can be adapted to the set-point curve by the electronic circuit. As an alternative, individual values of the setpoint curve may be determined at definable times. Values for the valve current and/or valve voltage which are determined in an operating-related switch-on operation and deviate because of acting interference quantities provide information regarding the amount of the acting interference quantity or quantities by direct comparison with the values determined for the setpoint curve. Consequently, adaptation of the characteristic of the valve current and/or valve voltage to the setpoint curve is also possible here in an advantageous manner. Both variants described above permit reliable closing of the valve in a sufficiently short period of time for various operating conditions, with optimum noise reduction also being achieved.

There is at least one interference quantity with each control operation or regulating operation. In the present case, there are several interference quantities, which will be discussed in greater detail below. If the coil is driven for a switch-on operation, an electromagnetic field that acts on the armature develops, thus setting it in motion. At the same time, the armature in its movement acts on a valve unit which should close the circuit of the heating and/or cooling water circuit. The water pressure in the medium circuit counteracts the valve unit and thus the armature which in turn counteracts the electromagnetic force created by the coil. Thus an interference quantity occurs at the valve unit, acting indirectly on the coil by way of the armature. Furthermore, the armature itself generates another interference quantity, namely due to friction in its mechanical guidance and/or due to the fact that the motion of the armature is attenuated by a spring, for example. Another interference quantity acts on the coil and is composed of an electric coil resistance that can be varied as a function of the coil temperature due to the change in the magnetic circuit produced by the movement of the armature (the armature is moved out of the coil) and due to the resulting change in the valve current. Finally, a voltage is induced by the movement of the armature in the coil and produces a current opposite the valve current. Due to these internal and external influences, the valve current and/or valve voltage does not increase in a valve switch-on operation according to the setpoint curve, but instead it increases in deviation from the latter. This deviation can preferably be detected by the analyzing device, which relays information regarding the interference quantities acting on the valve to the electronic control circuit, so the characteristic of the valve current and/or valve voltage can be adapted to the setpoint curve. In this way, a valve closing operation with reduced noise is made possible in a sufficiently short period of time in an advantageous manner.

In deviation from the preceding description, the setpoint curve of the valve current and/or valve voltage is not determined by a valve switch-on operation which is not influenced by any interference quantities or only by those of a known extent, but instead, in one variant, it is of course also possible to determine the setpoint curve on the basis of a simulation and/or a (laboratory) experiment. The values thus determined are used as standard values and can be stored in the analyzing device in particular.

Finally, the analyzing device preferably determines control parameters for influencing the characteristic of the valve current and/or valve voltage of a later time range from the rate of increase and/or from individual values of the valve current and/or valve voltage from the switch-on time of the valve until the time of reaching the plateau value as a function of the interference quantities acting on the valve. Furthermore, a prediction regarding the total valve closing time to be expected is possible from the initial characteristic of the valve control signal. For example, if the predicted total closing time is too long on the basis of a high water pressure, the electronic control circuit can increase the valve current and/or valve voltage so that the armature is accelerated to a greater extent, thereby yielding a shorter closing time in comparison with the total expected closing time. On the other hand, however, it is also possible to briefly turn off the valve current and/or valve voltage when a predicted total closing time is too short, resulting from a high speed of the armature, so that the speed of the armature is thereby reduced, yielding here again an optimum closing operation with reduced noise.

DETAILED DESCRIPTION

Figure 1:
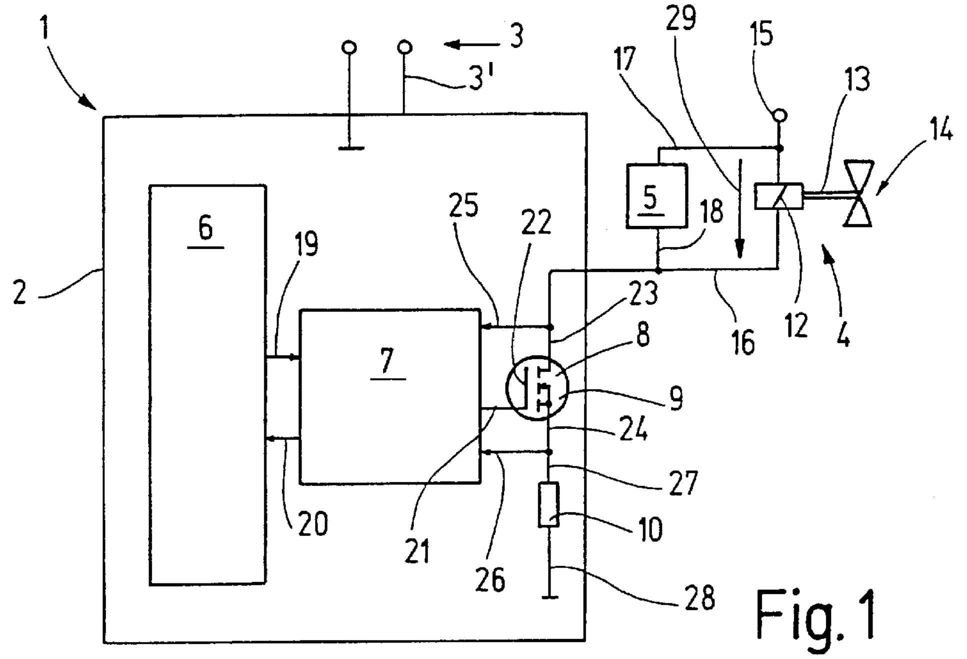
FIG. 1 shows a first embodiment of an electronic control circuit having an electromagnetic valve to be driven.

FIG. 1 shows an electronic control circuit 1, hereinafter referred to as control unit 2, which is supplied with voltage over terminals 3. A terminal 3' represents a connection to a positive terminal of a vehicle electric system (not shown in FIG. 1). Furthermore, FIG. 1 shows an electromagnetic valve 4 having a coil free-wheeling diode 5. Electromagnetic valve 4 is provided for a medium circuit (not shown here) so that it regulates a heating and/or cooling water supply for a heat exchanger of a heating and/or air-conditioning system. Control unit 2 includes a controlling system 6, a control circuit 7, an electronic switching element 8 and a shunt resistor 10. Switching element 8 is designed as a field effect transistor, hereinafter abbreviated as FET 9.

Electromagnetic valve 4 has a coil 12, an armature 13 mounted movably inside coil 12 and a valve unit 14, with the movable part (not shown in FIG. 1) of valve unit 14 being operated by armature 13. One terminal 15 of coil 12 of electromagnetic valve 4 is connected to a positive terminal of the vehicle electric system (not shown here), which is the positive battery terminal of the vehicle. At its other terminal 16, coil 12 is connected to control unit 2. Coil free-wheeling diode 5 is connected in parallel to coil 12, i.e., one terminal 17 of the coil free-wheeling diode is connected to terminal 15 of the coil and another terminal 18 of coil free-wheeling diode 5 is connected to the other terminal 16 of coil 12. As an alternative, coil free-wheeling diode 5 may also be integrated into control unit 2 (not shown in FIG. 1). Coil free-wheeling diode 5 then acts either between terminals 3' and 16 or it is connected in parallel to switching element 8 and acts between terminal 16 and ground (the negative terminal of the vehicle battery) of the vehicle electric system.

Controlling system 6 of control unit 2 transmits information over a connection 19 to control circuit 7 and receives information from control circuit 7 over a connection 20. Control circuit 7 controls gate 22 of FET 9 with its output 21, so the volume resistance between a source terminal, hereinafter referred to only as source 23, and a drain terminal, hereinafter referred to only as drain 24, can be varied as a function of a control signal applied to gate 22. In addition, control circuit 7 has terminals 25 and 26, with terminal 25 being connected to source 23 and terminal 26 being connected to drain 24. Furthermore, shunt resistor 10 is connected at its one terminal 27 to drain 24. Another terminal 28 of shunt resistor 10 is connected to ground, namely to the negative terminal of the vehicle battery.

On the whole, this yields a current path with coil 12, FET 9 and shunt resistor 10 being connected in series, with coil 12 being connected at its terminal 15 to the positive terminal of the battery, as mentioned above, and shunt resistor 10 being connected to ground. Due to the series connection of the components, a partial voltage, namely a valve voltage 29 is applied to coil 12.

Figure 2:
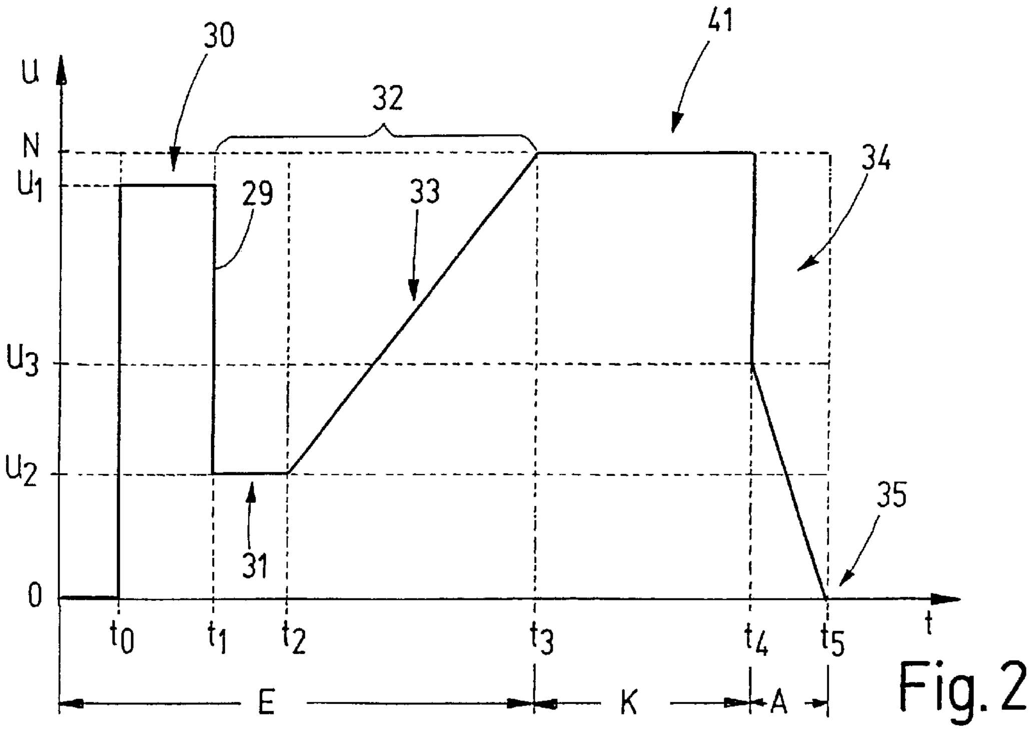
FIG. 2 shows a characteristic curve of a valve voltage applied to a coil plotted as a function of time.
Figure 6:
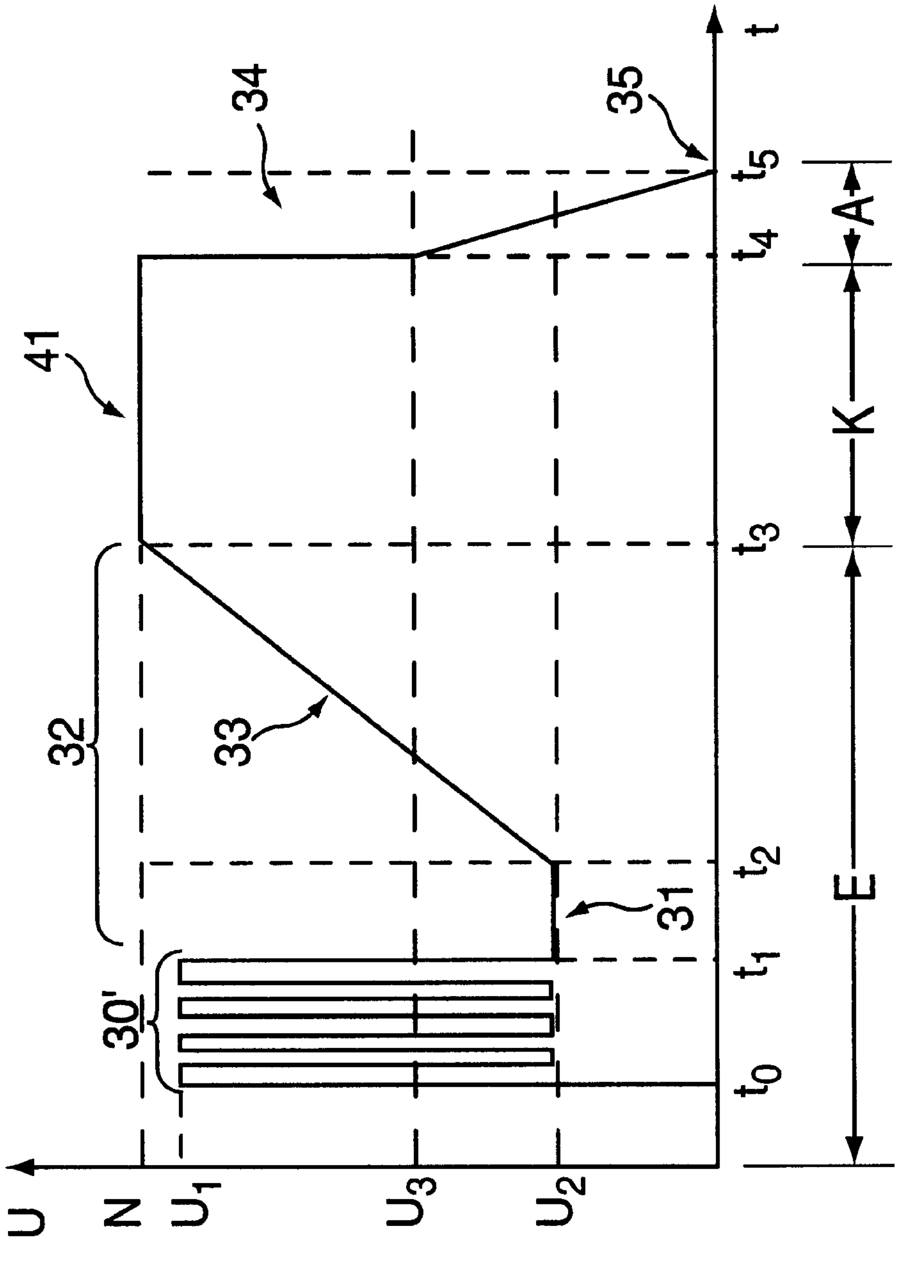
FIG. 6 shows an alternative embodiment of a characteristic curve of a valve voltage applied to a coil plotted as a function of time.

The diagram in FIG. 2 shows a characteristic of valve voltage 29 as a function of time during a switching operation which is subdivided into a switch-on phase E (0 to $t_3$), a phase with a constant valve voltage K ($t_4$–$t_3$) and a shut-down phase A ($t_5$–$t_4$). Voltage U is plotted on the ordinate axis and time t is plotted on the abscissa axis. When valve 4 is switched on, the characteristic of valve voltage 29 is composed of a switch-on pulse 30, a switch-on ramp 32, a closing time 41 and a shut-down ramp 34. Switch-on ramp 32 has a dead time 31 and a ramp 33. The level of switch-on pulse 30 represents a first value U, which may be greater than or less than a nominal value N and is applied to coil 12 during a period $t_1$–$t_0$. Switch-on ramp 32 begins at time $t_1$ and valve voltage 29 drops to a second value $U_2$. Second value $U_2$ thus forms the initial value of switch-on ramp 32, with switch-on ramp 32 having a total duration $t_3$–$t_0$. During dead time 31, second value $U_2$ is constant. Ramp time 33 beginning at time $t_2$ has a valve voltage 29 which increases linearly to nominal value N by time $t_3$. Nominal value N of valve voltage 29 is applied to coil 12 during closing time 41 for a period $t_4$–$t_3$ and thus forms a holding voltage. Valve voltage 29 drops at time $t_4$ to a third value $U_3$ which at the same time represents an initial value for shut-down ramp 34. During a period $t_5$–$t_4$ of shut-down ramp 34, valve voltage 29 drops to a voltage-free state 35. Consequently, electromagnetic valve 4 is preferably in its shut-down position at time $t_5$. FIG. 6 shows an alternate characteristic of valve voltage 29 as a function of time. The characteristic shown in FIG. 6 is similar to FIG. 2, however the switch-on pulse 30, has been replaced with multiple pulses 30' during period $t_1$–$t_0$. After the last switch-on pulse, the valve voltage drops to a second value $U_2$ and thus forms the initial value of switch-on ramp 32.

The characteristic of valve voltage 29 shown in FIG. 2 is generated by the fact that gate 22 of FET 9 is controlled with a signal over output 21 of control circuit 7 so that a volume resistance is established between source 23 and drain 24 so that the desired voltage drop occurs at switching element 8, i.e., valve voltage 29 according to the characteristic illustrated in FIG. 2 is obtained. The voltage drop is detected across terminals 25 and 26, taking into account the level of the battery voltage. This makes it possible for controlling system 6 to adjust the level of valve voltage 29 accurately to the desired setpoint curve. Several switching operations are generated by control unit 2 in succession with a period $t_5$–$t_0$ for the operation of electromagnetic valve 4, with the period of time between two switching operations being determined by the power consumed by the heat exchanger of the heating and/or air-conditioning system.

Figure 3:
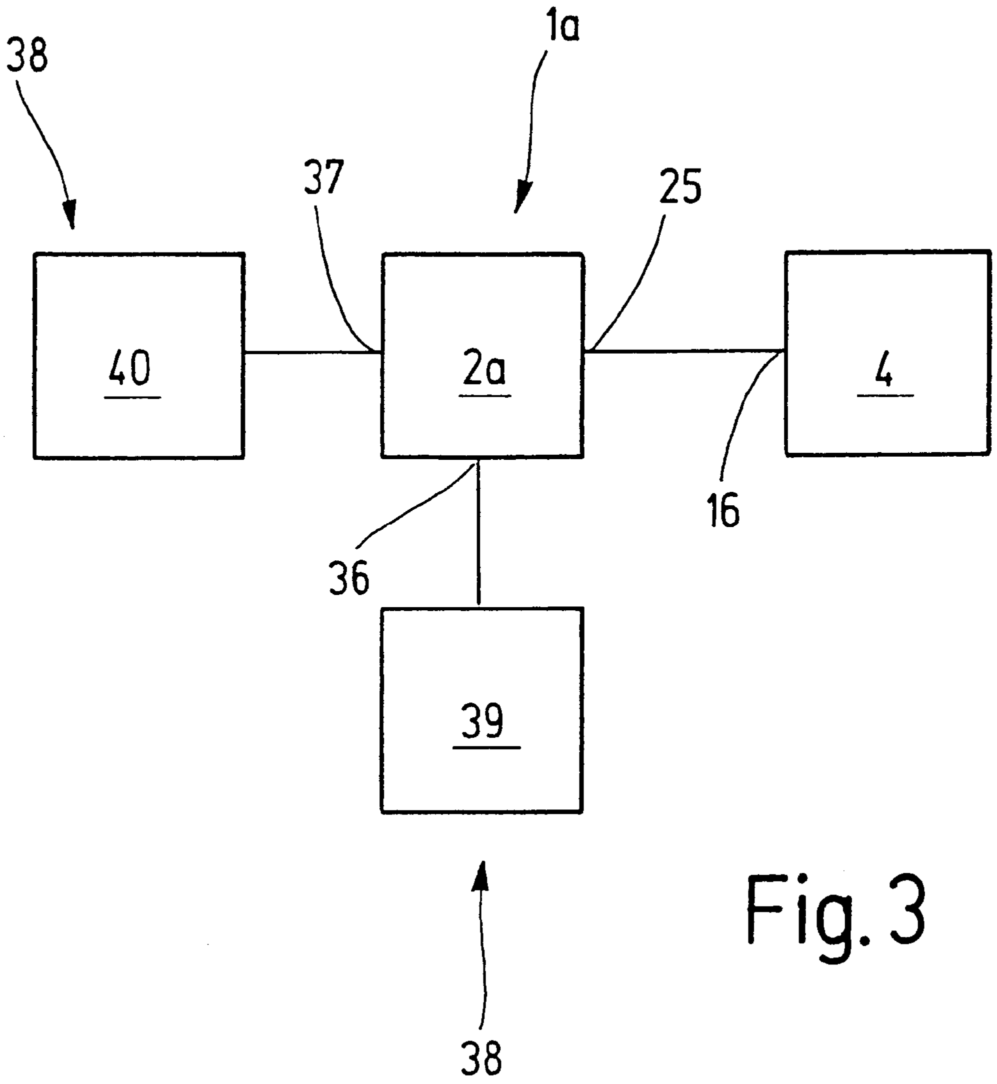
FIG. 3 shows a block diagram of a second embodiment of the electronic control circuit.

The embodiment in FIG. 3 shows an electronic circuit 1*a* designed as a control unit 2*a*. Terminal 16 of electromagnetic valve 4 is connected to terminal 25 of control unit 2*a,* resulting in the same basic design as that shown in FIG. 1. In addition to control unit 2 from FIG. 1, control unit 2*a* has terminals 36 and 37 with sensors 38 connected to them. A thermocouple 39 measures the temperature (as an interference quantity) of the coil, so that control unit 2*a* regulates valve voltage 29 as a function of the temperature of coil 12. Sensor 38 connected to output 37 is a pressure sensor 40 which senses a water pressure (as another interference quantity) in the heating and/or cooling water supply, namely the pressure that is to open or close electromagnetic valve 4. The quantities determined by sensors 38 are thus used to determine control parameters, so that the individual control segments are optimally adapted to changing operating states of a heating and/or air-conditioning system with regard to their period and amplitude. Of course, additional sensors 38 may be assigned to control unit 2*a* with additional terminals, although this is not shown in FIG. 3 for the sake of simplicity.

Instead of the valve voltage, the valve current may also be controlled, as explained in a greater detail below on the basis of another embodiment illustrated in FIG. 4.

Figure 4:
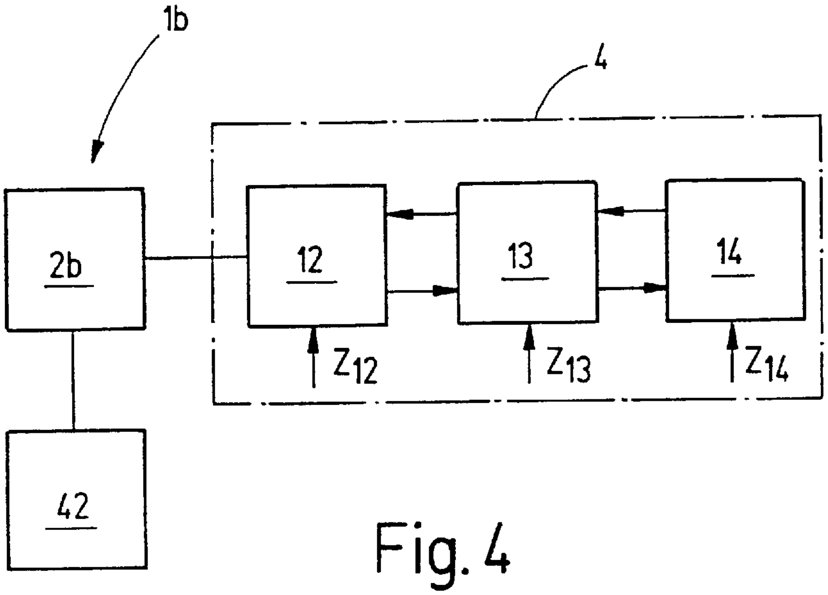
FIG. 4 shows a block diagram of a third embodiment of the electronic control circuit.
Figure 5:
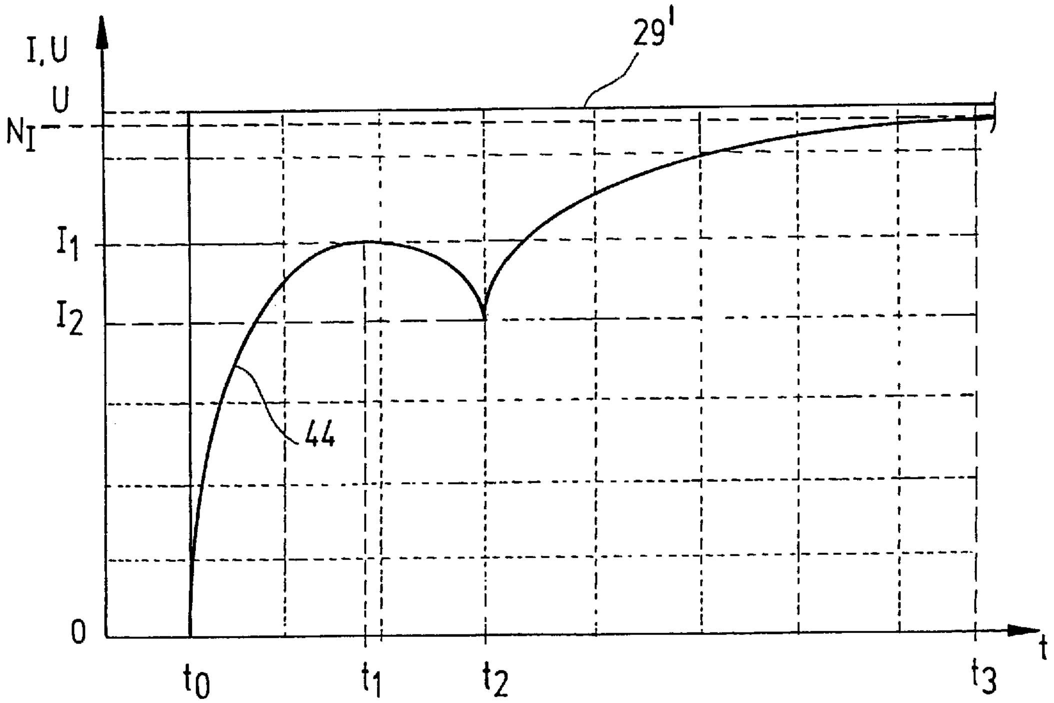
FIG. 5 shows a characteristic curve of a valve current plotted as a function of time, for controlling the electromagnetic valve with the electronic control circuit illustrated in FIG. 4.

For the embodiment according to FIG. 4, electronic circuit 1*b*, a digital and/or analog analyzing device 42 is assigned to a control unit 2*b*. It detects the signal driving valve 4, namely a valve current 44 (FIG. 5). It determines the rate of increase of valve current 44 at a definable time from the time characteristic of this signal, so a movement characteristic of armature 13 can be derived in comparison with a slope of the setpoint curve (not shown).

If coil 12 is driven by control unit 2*b* via switching element 8 (not shown in FIG. 4) with a valve voltage 29' having a value U (FIG. 5) which is constant over a period of time $t_3$–$t_0$, then valve current 44 first increases as a function of the inductance and the ohmic resistance of coil 12. It should be pointed out here that with valve current control, switching element 8 is preferably connected in parallel to coil 12. Because of the control, an electromagnetic field develops in coil 12, acting on armature 13, which is thus set in motion. In its movement, it acts on valve unit 14, which should interrupt or close the circuit of the heating or cooling water circuit (not shown). By closing, the interrupted medium circuit transmits an interference quantity $Z_{14}$ to valve unit 14. Interference quantity $Z_{14}$ is produced by the differential pressure between the inlet and outlet (not shown) of valve unit 14 and by the amount of the flow rate to be blocked. Interference quantity $Z_{14}$ depends on the temperature and viscosity of the medium, the rpm of the pump circulating the medium and operating states of any media circuit branches. Since interference quantity $Z_{14}$ acts on valve unit 14, it also acts against armature 13. During the movement of armature 13, it also experiences an interference quantity $Z_{13}$ produced by friction in its mechanical guide and by damping (electric, magnetic and/or mechanical) acting on it. Armature 13 thus counteracts the electromagnetic force produced by coil 12. Furthermore, an interference quantity $Z_{12}$ acting on coil 12 is composed of an electric coil resistance which can be varied as a function of the coil temperature, due to the change in the magnetic circuit produced by the armature movement and the resulting change in the coil current (valve current 44). Furthermore, a voltage is induced in coil 12 by the movement of armature 13, producing a current opposite the current energizing coil 12.

Due to the fact that analyzing device 42 detects the rate of increase in valve current 44, as mentioned above, this can be used to derive information about interference quantities $Z_{12}$, $Z_{13}$ and $Z_{14}$ acting on valve 4, so that valve current 44 can be controlled by control unit 2*b* as a function thereof. It is thus possible for it to be optimally adapted to the operating states of the heating and/or air-conditioning system. Therefore, closing of valve 4 with reduced noise is made possible in an advantageous manner, as will be discussed in greater detail below with reference to FIG. 5.

When valve 4 is driven with valve voltage 29' at the beginning of the switch-on operation, valve current 44 increases in a nonlinear pattern during a time range $t_1$–$t_0$, as described above. Through the movement of armature 13, a voltage is induced in coil 12, causing a current direction opposite that of energizing valve current 44. Due to the increasing speed of armature 13 after overcoming the initial frictional and spring forces and due to the higher inductive voltage thus induced, the rate of increase in valve current 44 decreases with increasing time t. At time $t_1$ valve current 44 reaches a plateau value $I_1$ which is preferably below a nominal value $N_I$ corresponding to the holding current of the armature in its switched-on position. The rate of increase in valve current 44 is zero here. Analyzing device 42 derives information from this, namely that armature 13 must have moved. Due to the continued increase in speed of armature 13, valve current 44 decreases in the remaining course until assuming at time $t_2$ a relative minimum with value $I_2$ which is below value $I_2$. The rate of increase in valve current 44 is negative in time range $t_2$–$t_1$. At time $t_2$ valve unit 14 reaches its end stop and thus valve 4 reaches its switched-on position. The movement of armature 13 is then concluded. Therefore, the negative field current generated in coil 12 by the accelerated movement of armature 13, leading to a reduction in valve current 44 (also referred to as the total coil current) during the movement of the armature, is now almost 0. Valve current 44 can thus build up to a nominal value $N_I$ unhindered in time range $t_3$–$t_2$. This characteristic of valve current 44 corresponds to a digital control of valve 4 by a valve voltage 29' which is driven abruptly from a value of zero at time to to a nominal value U.

It is also possible in the embodiment shown in FIG. 4 for the valve to be operated with a valve voltage 29 (in time range $t_5$–$t_2$ according to FIG. 2) after time $t_1$ when valve current 44 has reached plateau value $I_1$ or the rate of increase in valve current 44 has reached a preselectable value. Thus, at time $t_1$ valve voltage 29' with nominal value U is reduced to a value $U_2$ at time $t_1$, so the electromagnetic energy in coil 12 decreases. This leads to a reduced acceleration of armature 13. Therefore, a speed is established which is high enough to guarantee reliable closing of valve 4 but low enough for the noise produced when armature 13 strikes its end stop to be essentially prevented, with the influence of interference quantities $Z_{12}$, $Z_{13}$ and $Z_{14}$ being taken into account until reaching plateau value $I_1$ of the valve current.

If the parameters of state in the medium circuit change, then time ranges $t_1$–$t_0$, $t_2$–$t_1$ and $t_3$–$t_2$ would not be constant with each switching operation of valve 4, but instead would be variable as a function of acting interference quantities $Z_{12}$, $Z_{13}$ and $Z_{14}$. For example, if an especially high fluid pressure prevails in the medium circuit, reaching of time $t_1$ would be delayed when controlling valve 4, because higher forces would be acting against valve unit 14 and thus also armature 13. Valve current 44 increases with less steepness here, and this is detected by analyzing device 42, which determines the expected time $t_1$ in comparison with a slope of the setpoint curve. However, if period $t_1$–$t_0$ were too large, so that closing of valve 4 would take too long, it would cause control unit 2*b* to increase valve current 44, so that armature 13 counteracts the increased opposing forces, so that valve 4 can be closed with low noise in a sufficiently short period of time and nevertheless reliably. Furthermore, analyzing device 42 derives information regarding acting interference quantities $Z_{12}$, $Z_{13}$ and $Z_{14}$ from the rate of increase in valve current 44 in time range $t_1$–$t_0$, so the amplitude of valve current 44 can also be varied in subsequent time range $t_3$–$t_1$ as a function thereof.

In addition, if the movement of armature 13 is too fast, resulting in a very steep current rise, valve voltage 29' is interrupted briefly by control unit 2*b*, so that a dead time can be integrated into valve voltage 29', as in the embodiment according to FIG. 1. Several brief interruptions in valve voltage 29' in all control segments are also possible if needed. Therefore, an optimum closing operation of valve 4 is also implemented in this situation, taking into account interference quantities $Z_{12}$, $Z_{13}$ and $Z_{14}$.

To open valve 4 after the closing time, valve current 44 may be shut down either in a controlled or an uncontrolled manner. However, it is important to ensure that valve current 44 drops to zero in the shut-down phase, corresponding to the embodiment shown in FIG. 1, so that valve 4 can assume its shut-down position.

What is claimed is:

1. An electronic control circuit for controlling an electromagnetic valve which has an armature and a coil, the electronic control circuit comprising:

an electronic switching element connected in series with the coil of the electromagnetic valve, the electronic switching element controlling a valve voltage which is applied to the coil so that the valve voltage reaches a first value when the electromagnetic valve is switched on, wherein, at the first value, the valve voltage has a form of a switch-on pulse, wherein, after the valve voltage reaches the first value, the electronic switching element reduces the valve voltage to a second value which is between zero and the first value, wherein the second value forms an initial value of a switch-on ramp, wherein the switch-on ramp has a dead time following the switch-on pulse, and wherein, during the dead time, the second value of the valve voltage does not change, and wherein, after the valve voltage reaches the second value, the electronic switching element controls the valve voltage to reach a third value, the third value being greater than the second value and representing a holding voltage for maintaining the armature of the electromagnetic valve in a switched-on position.

2. An electronic control circuit for controlling an electromagnetic valve which has an armature and a coil, the electronic control circuit comprising:

an electronic switching element connected in series with the coil of the electromagnetic valve, the electronic switching element controlling a valve voltage which is applied to the coil so that the valve voltage reaches a first value when the electromagnetic valve is switched on, wherein, at the first value, the valve voltage has a form of a switch-on pulse, wherein, after the valve voltage reaches the first value, the electronic switching element reduces the valve voltage to a second value which is between zero and the first value, and wherein, after the valve voltage reaches the second value, the electronic switching element controls the valve voltage to reach a third value, the third value being greater than the second value and representing a holding voltage for maintaining the armature of the electromagnetic valve in a switched-on position.

3. The electronic control circuit according to claim 2, wherein the switch-on pulse has an amplitude which is greater than one half of the holding voltage.

4. The electronic control circuit according to claim 2, wherein the switch-on pulse has a period which is approximately between 0.1 and 0.6 times a value of a switching time of the electromagnetic valve which exists during an abrupt excitation of the electromagnetic valve and when the valve voltage is higher than the holding voltage.

5. The electronic control circuit according to claim 1, wherein the switch-on ramp has an end value which forms the third value.

6. The electronic control circuit according to claim 1, wherein, when the electromagnetic valve is turned off, the electronic switching element controls the valve voltage to drop to an initial value of a shut-down ramp, the initial value being between the third value and a voltage-free state value.

7. The electronic control circuit according to claim 2, wherein, when the electromagnetic valve is turned off, the electronic switching element controls the valve voltage to drop to an initial value of a shut-down ramp, the initial value being between the third value and a voltage-free state value.

8. The electronic control circuit according to claim 7, wherein the shut-down ramp has an end value which is smaller than the initial value of the shut-down ramp.

9. The electronic control circuit according to claim 5, wherein, when the electromagnetic valve is turned off, the electronic switching element controls the valve voltage to drop to an initial value of a shut-down ramp, the initial value being between the third value and a voltage-free state value.

10. The electronic control circuit according to claim 9, wherein at least one ramp of the switch-on ramp and the shut-off ramp has one of a linear voltage characteristic, a progressive voltage characteristic and a degressive voltage characteristic.

11. The electronic control circuit according to claim 2, wherein a duration of the switch-on pulse is dependent on a position of the armature.

12. The electronic control circuit according to claim 2, wherein the electronic control circuit determines a position of the armature from a characteristic of at least one of the valve voltage and a valve current of the electromagnetic valve.

13. The electronic control circuit according to claim 2, wherein the electronic switching element adjusts a level of the switch-on pulse to the first value independently from a power supply voltage of the electronic control circuit.

14. The electronic control circuit according to claim 1, further comprising:

an analyzing device, wherein the electromagnetic valve generates a valve current and a holding current, the holding current maintaining the armature of the electromagnetic valve in the switched-on position, wherein, at a start of a switch-on operation of the electromagnetic valve, the analyzing device determines, as a function of a rate of increase of the valve current, a particular time at which the valve current assumes a plateau value, the plateau value being below the holding current, and wherein the rate of increase in the valve current is approximately zero when the valve current assumes the plateau value.

15. The electronic control circuit according to claim 13, wherein the analyzing device determines control parameters for influencing a particular characteristic of the valve voltage for a later time range as a function of interference quantities acting on the electromagnetic valve, the control parameters being determined from at least one of the rate of increase of the valve current and individual values of the valve current, starting from a switch-on time of the electromagnetic valve until the particular time.

16. The electronic control circuit according to claim 14, wherein the analyzing device determines the interference quantities by comparing the rate of increase of the valve current to a further rate of increase of the valve current which is free of the interference quantities, the interference quantities being determined to influence the particular characteristic of the valve voltage.

17. The electronic control circuit according to claim 16, further comprising:

a control unit detecting the interference quantities using sensors.

18. The electronic control circuit according to claim 14, further comprising:

a control unit assigned to the analyzing device.

* * * * *